J. Kohler,
Cage Trap.
No 79,577.   Patented July 7, 1868.
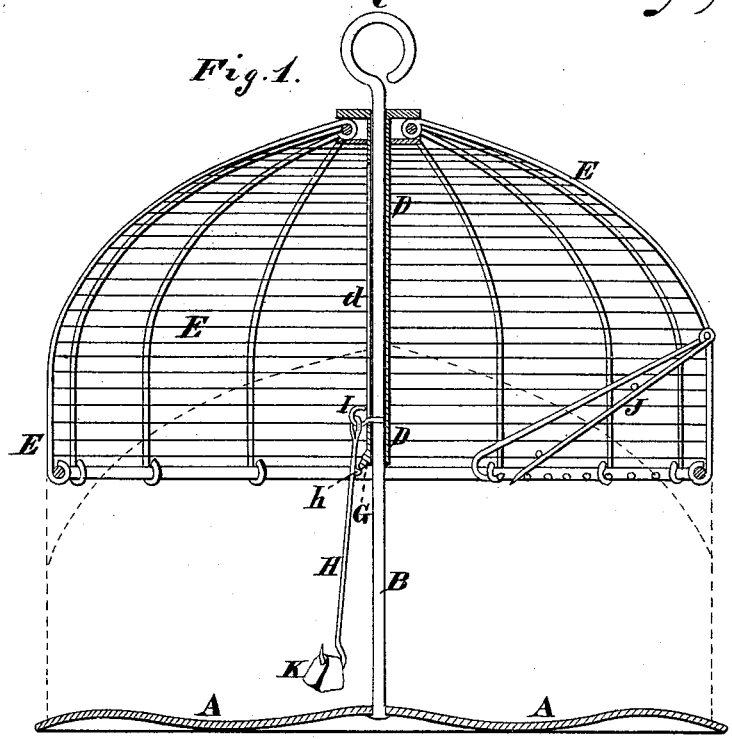
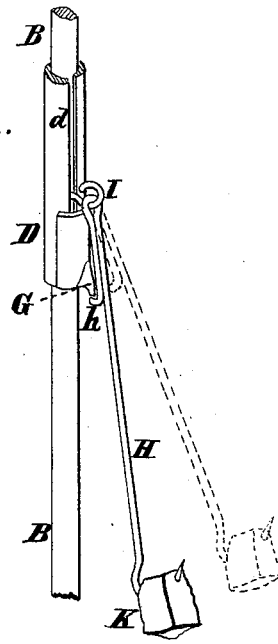
Attest,
Chas Bauer
Jas. H. Layman
Inventor
Joseph Kohler
By Knight Bros
Attys

United States Patent Office.

JOSEPH KOHLER, OF CINCINNATI, OHIO.

Letters Patent No. 79,577, dated July 7, 1868.

---

IMPROVED ANIMAL-TRAP.

---

The Schedule referred to in these Letters Patent and making part of the same.

---

TO WHOM IT MAY CONCERN:

Be it known that I, JOSEPH KOHLER, of Cincinnati, Hamilton county, Ohio, have invented a new and useful Improvement in Animal-Traps; and I do hereby declare the following to be a full, clear, and exact description thereof, reference being had to the accompanying drawings, making part of this specification.

This invention relates to that class of traps which are elevated when set, and which imprison the animal when they fall; and my improvement consists in the devices which maintain the trap in its elevated position, and which also permit its descending as soon as the animal commences to nibble at the bait.

In the accompanying drawings—

Figure 1 is a vertical section through an animal trap embodying my improvements, the trap being in its elevated or set position.

Figure 2 is a perspective view, on an enlarged scale, of the devices for setting the trap.

A represents the floor or base of the trap, from which rises, vertically, a shaft, B, whose upper end terminates in a handle, C, which permits of the apparatus being carried from place to place.

Adapted to play freely upon the shaft B is a sleeve, D, which is provided with a longitudinal slot, $d$, and the cage, E, of the trap is secured to the upper end of this sleeve. The lower end of this sleeve is provided with a bearing-point, G, which, when the trap is set, rests upon a short stud, $h$, which projects from near the upper end of the bait-hook H.

The upper end of the bait-hook is attached to a pivot, I, in such a manner that the said hook may swing freely in every direction, and the pivot I, after passing through the slot $d$, is secured to the shaft B.

The cage E is provided with one or more self-closing doors, J, which will permit a number of animals entering the trap after it has been sprung or dropped by the first one.

To set the trap, it is only necessary to elevate the cage E, and, with it, the slotted sleeve D $d$, and allow the bearing-point G to rest upon the stud $h$, and as soon as any animal commences to tug at the bait K on the hook H, said stud will be withdrawn from under the bearing-point, and as there is no longer anything to retain the cage in its elevated position, it instantly drops and rests upon the floor A, thereby imprisoning the intruder.

After one animal has been caught, others will enter through the self-closing door J, until as many have been secured as the trap will contain.

I claim herein as new, and of my invention—

The arrangement of the base or foot A and shaft B, with the sliding cage E, slotted sleeve D $d$, bearing-point G, bait-hook H $h$, and pivot I, or their equivalents, substantially as herein described, and for the purpose set forth.

In testimony of which invention, I hereunto set my hand.

JOSEPH KOHLER.

Witnesses:
GEO. H. KNIGHT,
JAMES H. LAYMAN.